United States Patent [19]

Leiber et al.

[11] Patent Number: 4,958,704
[45] Date of Patent: Sep. 25, 1990

[54] HYDRAULIC TELESCOPIC SHOCK ABSORBER

[75] Inventors: Heinz Leiber, Oberriexingen; Walter Klinker, Stuttgart; Gerhard Meier, Waiblingen, all of Fed. Rep. of Germany

[73] Assignee: Daimler-Benz Aktiengesellschaft, Fed. Rep. of Germany

[21] Appl. No.: 378,037

[22] Filed: Jul. 11, 1989

[30] Foreign Application Priority Data

Jul. 11, 1988 [DE] Fed. Rep. of Germany ....... 3823430

[51] Int. Cl.⁵ .............................................. F16F 9/50
[52] U.S. Cl. .................................. 188/285; 188/267; 188/299
[58] Field of Search ............... 188/267, 280, 281, 285, 188/288, 299; 267/218; 280/707

[56] References Cited

U.S. PATENT DOCUMENTS 4,673,067  6/1987  Münning et al. ............... 188/285 X
4,729,459  3/1988  Inagaki et al. ...................... 188/285

FOREIGN PATENT DOCUMENTS 2607238   9/1976  Fed. Rep. of Germany ...... 188/267
2911768   1/1983  Fed. Rep. of Germany .
3611315  10/1987  Fed. Rep. of Germany .
3518327  11/1987  Fed. Rep. of Germany .
3635894   5/1988  Fed. Rep. of Germany ...... 188/267
2147683   5/1985  United Kingdom .

*Primary Examiner*—Duane A. Reger
*Attorney, Agent, or Firm*—Evenson, Wands, Edwards, Lenahan & McKeown

[57] ABSTRACT

A hydraulic telescopic shock absorber wherein damping characteristic can be varied by means of an electromagnetic valve arrangement, the coil of which is accommodated so as to be protected against the hydraulic medium of the shock absorber. The control preferably takes place as a function of the pressure difference between the spaces above and below the piston of the shock absorber.

13 Claims, 5 Drawing Sheets

HYDRAULIC TELESCOPIC SHOCK ABSORBER

BACKGROUND AND SUMMARY OF THE INVENTION

The invention relates to a hydraulic telescopic shock absorber with a cylinder and with a piston which is displaceable therein and is retained by means of a piston rod which divides the cylinder into two chambers which are separated from one another by a piston. The two chambers are connected, or connectable, to one another via channels passing through, or bypassing, the piston or the piston rod. The channels are controllable, or adjustable at least partially, by an electromagnetic valve arrangement which is arranged on the piston rod and which controls a slide for varying the opening cross-section of the channels. The slide forms the armature, or a part, of an electromagnet connected thereto.

Shock absorbers of this general type are known according to German Patent Specification 2,911,768 or German Patent Specification 3,346,352. There a coil is arranged within a space communicating with one chamber or the other and is embedded in the hydraulic medium. Even though hydraulic media are usually produced on an oil base and therefore electrically insulating, such an arrangement presents problems because the hydraulic media contain more or less aggressive constituents which, under certain circumstances, can lead to corrosion or other damage on the coil and electrical lines.

The object of the invention is, therefore, to provide hydraulic telescopic shock absorbers in which the electrical components of the electromagnetic valves, serving for controlling the damping resistance, are accommodated in an especially operationally reliable manner.

According to the invention, this object is achieved because the coil(s) of the electromagnetic valve arrangement are accommodated in a housing which is sealed relative to the hydraulic medium and which is arranged on one side, for example the piston-rod side, of the piston. The coil, as seen in axial section through the telescopic shock absorber, is surrounded on its sides facing away from the armature in a U-shaped or C-shaped manner by ferromagnetic housing parts located on the same side as the armature and in a clearance between these housing parts, by non-magnetizable material. Apart from the fact that the coil is accommodated in a protected manner, this design guarantees good magnetic properties and correspondingly high adjusting forces, since the magnetic field surrounding the coil is guided and sharply focused through the ferromagnetic housing parts surrounding the coil and is accordingly effective at high field strengths in the transitional regions between these housing parts and the armature.

At the same time, the armature can be arranged in a space filled with hydraulic medium, so that without special sealing measures, the armature can be connected to the slide of the electromagnetic valve arrangement, or be provided as part of the slide valve.

To guarantee that the hydraulic forces acting on the armature are mutually compensated, or generate no appreciable force urging the armature in the direction of an end position, a first preferred embodiment of the invention provides that the coil housing surrounds a cylindrical space, which is open towards one chamber and in which the armature is arranged so as to be displaceable in a piston-like manner. The armature is made annular, or with an axial bore, so that there is an approximately equal hydraulic pressure on the two end faces of the armature.

In a further preferred embodiment, the armature is arranged on the end face of the coil. The receiving space for the coil in the housing is closed off on the same side as the armature by a plate made of non magnetizable material. At the same time, the armature is appropriately designed as a perforated circular disc, which is retained in one end position at a short distance from the plate by stop points arranged on the plate, or on the circular disc. This insures that the circular disc, or armature, is subjected to the pressure of the hydraulic medium on both sides in all possible positions. This design is characterized by a special simplicity in terms of construction, because the armature, or the circular disc, requires no guidance within the coil.

The electromagnetic valve arrangement is preferably controlled as a function of the pressure in at least one chamber, there appropriately being a differential-pressure measuring device which records the pressure difference between the two chambers. Since the pressure difference changes in proportion to the resistance offered by the shock absorber to the particular relative movement between the piston and cylinder, the pressure-difference signal emitted by the measuring device is also a measure of the particular supporting forces generated by the shock absorber. This type of control is therefore also especially suitable for those active suspension systems in which the supporting forces of the wheel support units are to be influenced directly.

Other objects, advantages and novel features of the present invention will become apparent from the following detailed description of the invention when considered in conjunction with the accompanying drawings.

DETAILED DESCRIPTION OF THE DRAWINGS

Figure 1:
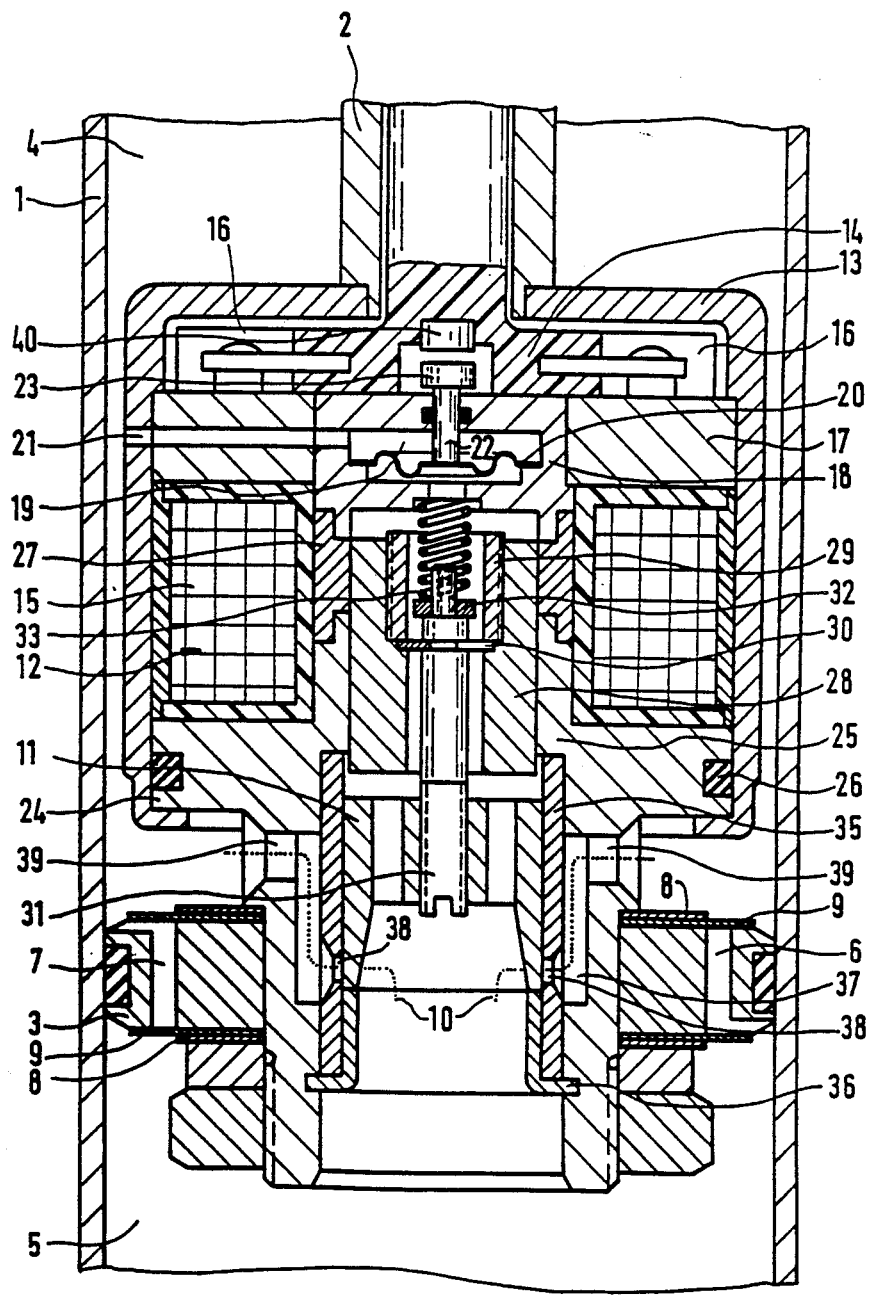
FIG. 1 shows a sectional view of a telescopic shock absorber according to the invention, in which the coil of the electromagnet interacts to have a piston-like armature.

The telescopic shock absorber illustrated in FIG. 1 possesses a cylinder part 1 which is subdivided into two chambers 4 and 5 by a piston 3 retained on a piston rod 2. The chambers 4 and 5 are connected to one another via axial channels 6 and 7 arranged in the piston 3 and designed as throttle zones. The channels each have a horizontal leg at one end thereof which is open. For this purpose, spring leaves 8 and 9 are arranged on the top side and underside of the piston 3 and seek to respectively shut off the upper orifices of the channels 6 and the lower orifices of the channels 7. The lower end of channel 6 is open to chamber 5 and the upper end of channel 7 is open to chamber 4. When the piston 3 is pushed downwards in FIG. 1 with sufficient force, the hydraulic pressure increases in the lower chamber 5, until a sufficient pressure is obtained which is able to lift off the upper spring leaves 8 from the upper orifices of the channels 6 (right hand side of FIG. 1). The piston 3 then continues downwards under downwardly directed forces while hydraulic medium is displaced from the lower chamber 4 into the upper chamber 5.

The volumes of the chambers 4 and 5 are varied non-uniformly during lifting movements of the piston 3, because the piston rod 2 is arranged on one side of the piston 3. One of the chamber 4 and 5, usually the lower chamber 5, is connected to a compensating chamber (not shown) which receives a compressible medium, the volume of which can be varied counter to a spring force. Instead of this, it is also possible to partially fill one of the chambers 4 and 5, especially the chamber 4, with a compressible pneumatic medium.

When the piston 3 is subjected to a sufficiently high force in the upward direction, the pressure in the upper chamber 4 increases correspondingly, until it reaches a certain pressure which forces the lower spring leaves 9 away from the lower orifices of the channels 7 (right hand side of FIG. 1). The piston 3 then shifts upwards with hydraulic medium being displaced from the chamber 4 into the chamber 5.

To make it possible to vary the resistance against which it is possible for the piston 3 to shift in the cylinder part 1, bypass 10 is arranged in the piston 3 or in the piston rod 2 and is controlled by a slide-like closing member 11 which is actuated by an electromagnet 12. The electromagnet 12 is arranged in the immediate vicinity of the piston 3.

For this purpose, a cup-like housing 13 is arranged at the end of the tubular piston rod 2 and opens downwards. This housing possesses an upper bottom portion which merges continuously into a peripheral wall of the housing and has a central middle orifice, in which the lower end of the piston rod 2 is fastened.

A plate-shaped plastic part 14 is accommodated in the cup-like housing 13 underneath the said bottom of the cup-like housing and projects upwardly with a bar-like extension into the hollow piston rod 2.

Embedded in the plastic part 14 are electrical leads, not shown in detail, for an electrical coil 15 of the electromagnet 12. The electrical connection are accommodated in recesses 16 of the plastic part 14.

Arranged adjacent to and below the end face of the plastic part 14 is a solid annular disc 17 made of ferromagnetic material, which is secured from shifting upwards by an annular step on the inner side of the peripheral wall of the cup-like housing 13 and which is retained in the housing 13 with a press fit. That is to say the inner side of the housing 13 rests under high pressure on the outer peripheral side of the annular disc 17.

A middle part 18 is arranged in the manner of a plug with a press fit inside the middle orifice of the annular disc 17 and has a circular cross-section likewise consisting of ferromagnetic material. This middle part 18 surrounds a chamber 19, subdivided by means of a diaphragm 20 and which has a lower opening. The region of the chamber 19, underneath the diaphragm 20, communicates with the lower chamber 5 in the cylinder part 1 through this opening while the part of the chamber 19, above the diaphragm 20, communicates with the upper chamber 4 of the cylinder part 1 via a radial bore 21 guided from the outside of the housing 13 through the annular disc 17 into the middle part 18 to extend as far as the chamber 19.

Located on the upper side of the diaphragm 20 is a tappet 22 which passes sealingly through a bore in the upper end face of the middle part 18 and which, by means of a head 23 arranged on it, projects into a corresponding recess in the lower end face of the plastic part 14. Adjacent to the annular disc 17, in the downward direction in FIG. 1, is the annular coil 15 which is surrounded by an electrically insulating sheath and into which the middle part 18 projects somewhat and with a region extending downwards beyond the annular disc 17.

Arranged on the underside of the coil 15 is a flange-like solid collar 24 of a tubular part 25, which consists of ferromagnetic material and which projects into the coil 15 from below. The collar 24 is retained in the housing 13 on its outer periphery by a press fit. A sealing ring 26 can be arranged in an annular groove on the outer periphery of the collar 24, in order to guarantee good leak proofing between the peripheral wall of the housing 13 and the collar 24 even under very high hydraulic pressures.

A sleeve 27, made of non-magnetizable material, is fitted between and connects the tubular part 25 and the middle part 18 in a fluid-tight manner so that the coil 15 is protected against the inflow of hydraulic medium.

The middle part 18, the tubular part 25 and the sleeve 27 jointly surround a central bore, in which a tubular armature 28, consisting of ferromagnetic material and belonging to the electromagnet 12, is displaceably received in the manner of a piston.

The axial middle bore of the armature 28 widens upwards in FIG. 1 in a step-shaped manner into a threaded portion and into which is screwed a tubular screw 29. The screw 29 serves for retaining a perforated disc 30 inserted into the middle bore of the armature 28 on the annular step of the middle bore.

The perforated disc 30 has a sufficient number of orifices to ensure that hydraulic medium can flow through from the lower end face of the armature 28 to its upper end face. Furthermore, the perforated disc 30 serves for the radial and axial mounting of a screw pin 31 which retains an annular disc 32 forming an abutment of a helical compression spring 33, at an upper tapered end. The end of the spring facing away from the annular disc 32 is supported on an annular web of the middle part 18 within the lower orifice of the chamber 19. The helical compression spring 33 accordingly seeks to urge the armature 28 downwards in FIG. 1.

The lower threaded end of the screw pin 31 is screwed into a middle threaded bore of the piston-like slide 11, through which several axial bores pass within its peripheral casing. The slide 11 is guided slidably in a bush 35, the inside diameter of which is matched to the outside diameter of the slide 11 and is slightly larger than the outside diameter of the armature 28. The bush 35 is arranged in a radially widened region of the tubular part 25, which is adjacent (in the downward direction) to the bore slidably receiving the armature 28. The bush 35 is retained axially between an inner annular step of the tubular part 25 and a locking ring 36, which itself is pressed into an inner annular groove on the tubular part 25. The locking ring 36 serves at the same time as a lower limit stop for the slide 11.

On the outside of the bush 35 is an annular space 37, made in the tubular part 25 and which communicates, via radial orifices 38 in the bush 35, with the lower chamber 5 of the cylinder part 1 and, via radial orifices 39 in the tubular part 25, with the upper chamber 4 in the cylinder part 1. The radial orifices 38 in the bush 35 can be controlled by means of the slide 11, that is to say closed off completely or opened more or less wide.

The piston 3, together with the spring leaves 8, is retained outwardly on the tubular part 25 below the radial orifices 39.

The telescopic shock absorber illustrated functions as follows:

When the coil 15 does not receive any electrical current, the slide 11 is held in the lower end position shown in FIG. 1 by means of the helical compression spring 33. The bypass 10 leading through the annular chamber 37 and the orifices 38 and 39 are accordingly blocked In this operating phase, the resistance which the piston 3 must overcome during a stroke movement in the upward or downward direction is determined solely by the channels 6 and the spring leaves 8 and by the channels 7 and the spring leaves 9 respectively.

As soon as current flows through the electrical coil 15, a magnetic field is generated in the region of the sleeve 27 and seeks to push the armature 28 upwards in FIG. 1 and counter to the force of the helical compression spring 33. The armature 28 is thereby shifted to a greater or lesser extent, depending on the current intensity of the electrical current passing through the electrical coil 15. The slide 11 correspondingly opens the orifices 38 so that the bypass 10 is opened proportionately. The hydraulic resistance counteracting a stroke movement of the piston 3 decreases correspondingly, since chambers 4 and 5 are connected through the bypass 10 and the open orifices 38.

The strength of the electrical current passing through the coil 15 can be controlled as a function of the pressure difference between the chambers 4 and 5 of the cylinder part. To this end, the head 23 of the tappet 22 on the diaphragm 20 (subjected on the top side to the pressure in the chamber 4 and on the underside to the pressure in the chamber 5) interacts with a pressure sensor 40, the output signal of which is used for controlling the current intensity of the electromagnetic coil 15.

The telescopic shock absorber illustrated is characterized by a simple construction. The housing 13 holds together the supporting parts and can be produced by deep-drawing. The relative position of the slide 11 in relation to the armature 28 can be adjusted by rotating the screw pin 31. Virtually no one-sided hydraulic forces can act on the armature 28, because the upper and lower end faces of the armature 28 are always subjected to virtually identical hydraulic pressures, since the central cavities in the middle part 18, in the sleeve 27 and in the tubular part 25 communicate, below the diaphragm 20, with the lower chamber 5 of the cylinder part 1.

Figure 2:
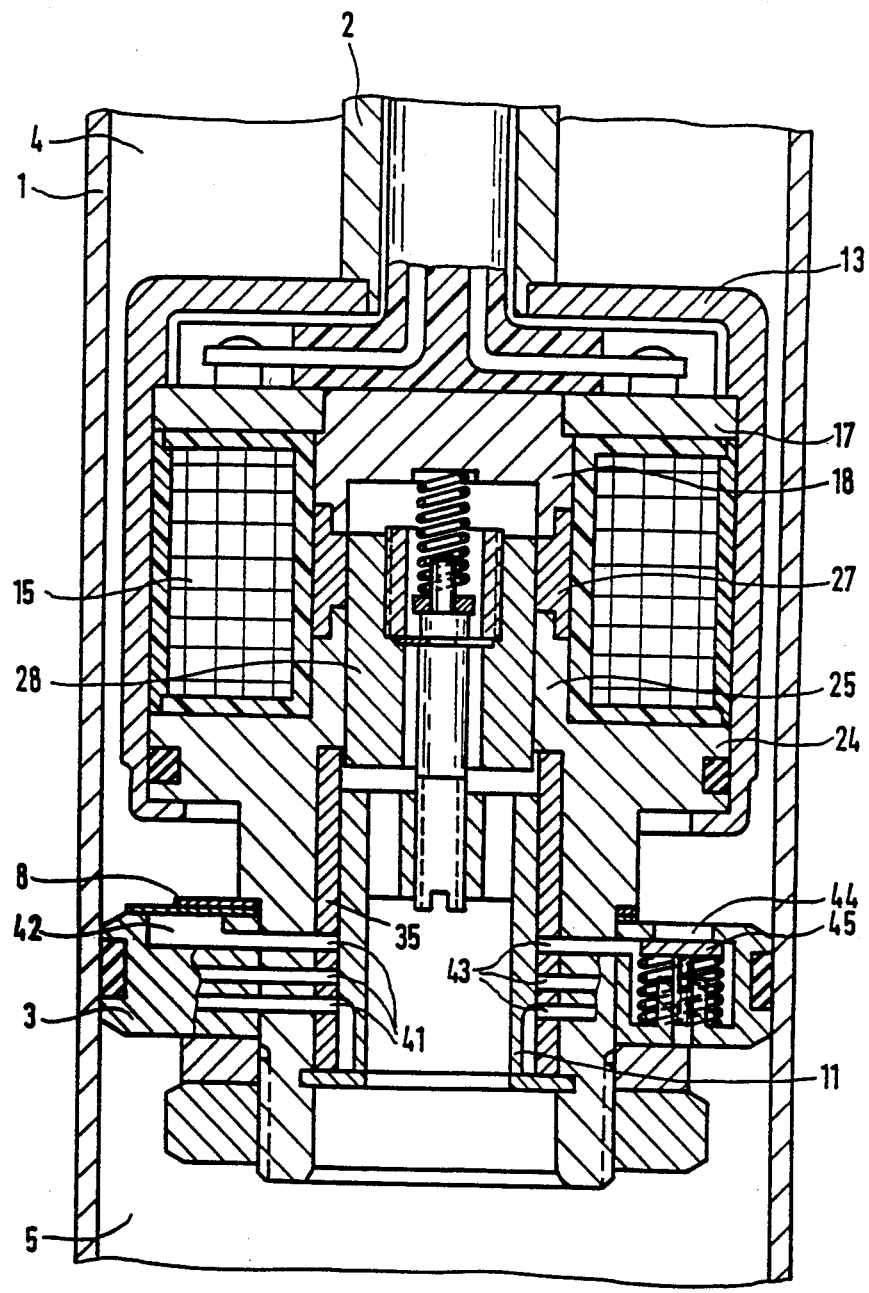
FIG. 2 shows a telescopic shock absorber similar to that of FIG. 1, with a modified valve arrangement.

In contrast to the embodiment according to FIG. 1, the embodiment shown in FIG. 2 has, in its bush 35, several radial orifices 41 which are spaced in the axial direction of the bush 35 and are continued through the tubular part 25 and the piston 3 to open out on the upper side of the piston 3 at orifices 42 controlled by the spring leaves 8. The spring leaves 8 lift off from the said orifices 42 as soon as the hydraulic pressure in the orifices 41 and 42 is higher than in the upper chamber 4 of the cylinder part 1.

Furthermore, radial orifices 43 are arranged in the bush 35 and are spaced from one another in the axial direction of the latter. These orifices 43 continue through the tubular part 25 into the piston 3 and there open out respectively at orifices 44 on the top side of the piston 3. The orifices 44 are controlled by poppet valves 45, which work in the manner of non-return valves and which open when a pressure sufficiently higher than that in the respective radial orifices 43 is present in the upper chamber 4 of the cylinder part 1.

Depending on the position of the slide 11, a different number of radial orifices 41 and 43 are opened, so that the hydraulic resistance opposing stroke movements of the piston 3 changes correspondingly in steps.

At the same time, the slide 11 can be so designed or the radial orifices 41 and 43 so arranged that, even in the lower end position of the slide 11, at least one respective radial orifice 41 or 43 still remains free. In principle, however, it is also possible for the slide 11 to close all the orifices 41 and 43 in its lower end position, so that the stroke movability of the piston 3 in the cylinder part 1 can be blocked.

The movements of the slide 11 can, in turn, be controlled as a function of the pressure difference between the chambers 4 and 5 of the cylinder part 1. For this, there can be a differential-pressure meter as in the embodiment according to FIG. 1 (not shown in FIG. 2) which, as in FIG. 1, possesses a diaphragm 20 which is subjected on the top side to the pressure in the chamber 4 and on the underside to the pressure in the chamber 5.

If appropriate, the spring leaves 8 or the poppet valves 45 can also be omitted on some of the orifices 42 and 44, if the slide 34 is to control connecting paths between the chambers 4 and 5 with a specially low throttle resistance.

Figure 3:
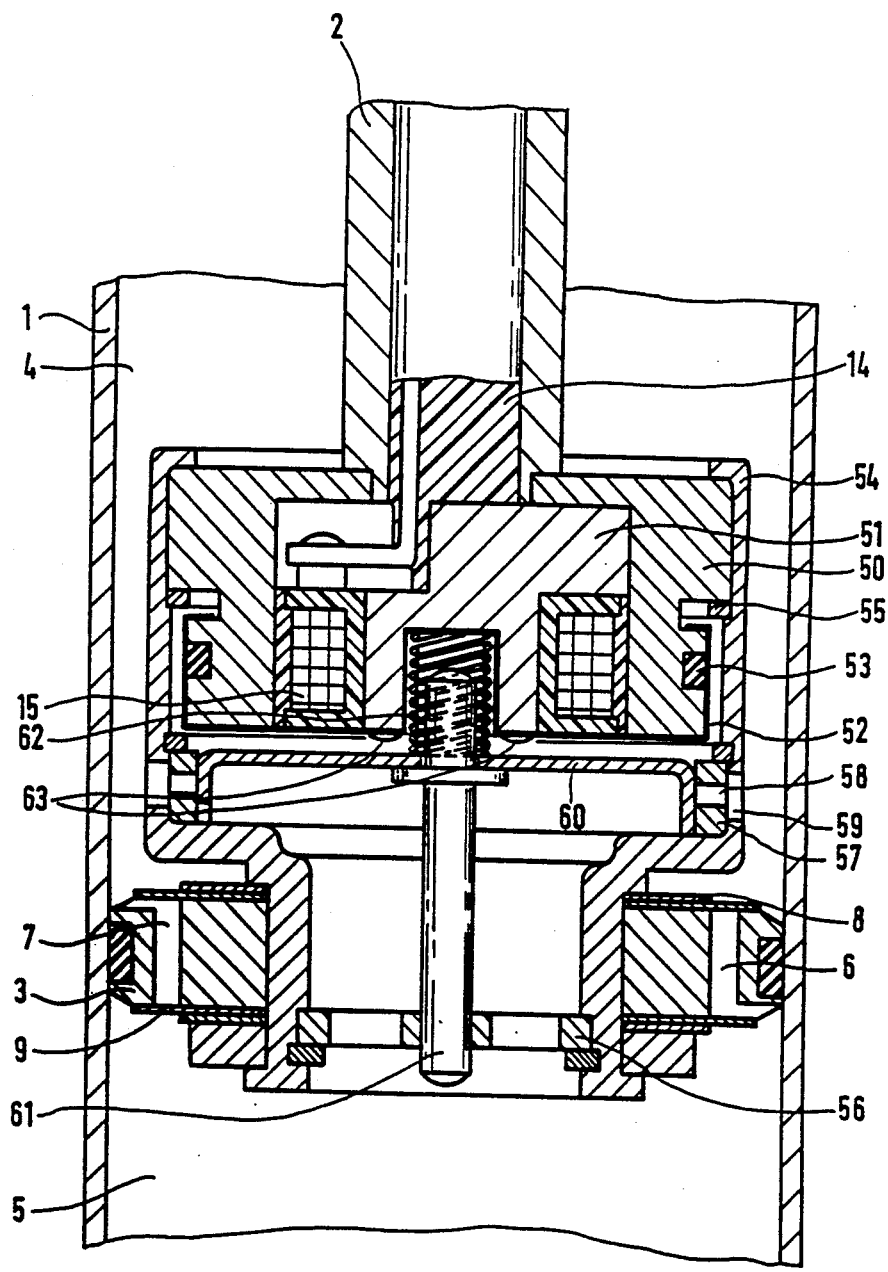
FIG. 3 shows a telescopic shock absorber according to the invention, with a dish or disc-like armature which is arranged with as large a diameter as possible on the end face of the coil of the electromagnet.

In the embodiment illustrated in FIG. 3, a solid bowl-shaped part 50 is fastened to the piston rod 2 and consists of ferromagnetic material and is open downwards. That region of the bowl-shaped part 50, which is at the top in FIG. 3, has a somewhat larger outside diameter than the region adjacent to it in the downward direction. A solid insert piece 51, likewise made of ferromagnetic material, is arranged within the bowl-shaped part 50. The insert piece 51, in its lower region, has an outside diameter reduced in step form, in such a way that the bowl-shaped part 50 and the insert piece 51 jointly surround an annular space which serves for receiving the electrical coil 15. Furthermore, in the insert piece 51 on its toP side there are also recesses, into which are arranged the electrical connections of the coil 15, ,or connecting the coil to the electrical leads embedded in the plastic part 14. Additionally, the insert piece 51 has a central blind bore that opens downwards in FIG. 3.

The annular space occupied by the coil 15 is closed off at the bottom by means of a plate part 52 made of non-magnetizable material. This plate part 52 has a middle cup-shaped region which projects into the downwardly open blind bore of the insert piece 51. Otherwise the plate part 52 surrounds the lower region of the bowl-shaped part from the outside by means of a cylindrical edge zone. The edge of the plate part 52, which is at the top in FIG. 3, is locked in a flanging manner into a peripheral groove of the bowl-shaped part 50. To guarantee an especially reliable fluid-tight arrangement, a sealing ring 53 is arranged in an annular groove of the part 50. This sealing ring 53 is surrounded by the plate part 52.

The piston 3 is retained on the bowl-shaped part 50 by means of a tubular housing 54 made of deep-drawn sheet metal. The housing 54 firmly surrounds the upper region of the bowl-shaped part 50 of larger outside diameter The part 50 is secured axially between the flanged upper edge of the housing 54 and a ring 55 which is retained in an inner peripheral groove of the housing 54, or on an inner annular step of the latter.

In the region of the piston 3, the housing 54 has a diameter, reduced in accordance with the inside diameter of the piston 3. At the same time, the piston 3, which moreover corresponds in terms of construction to the piston of FIG. 1, is retained axially between an annular step on the outside of the housing 54 and the lower outwardly flanged edge of the housing 54. For stiffening the arrangement, a perforated disc 56 is inserted into the middle orifice of the housing 54 at the lower end of the latter.

Arranged underneath the bowl-shaped part 50 and within the housing 54, is a bush-like ring 57 which is secured axially by means of an annular step of the housing 54 and a spring ring inserted into an inner peripheral groove. The bush-like ring 57 possesses several radial orifices 58 which are continued in the form of radial orifices 59 into the housing 54 to allow a connection to be made between the lower chamber 5 and the upper chamber 4 of the cylinder part 1. A thin perforated disc 60, made of ferromagnetic material, is arranged within the bush-like ring 57 so as to be axially displaceable and has a cylindrical downwardly projecting outer peripheral edge which controls the radial orifices 58. The perforated disc 60 possesses a central tappet 61 which is guided axially at its lower end in a central bore of the perforated disc 56. The helical compression spring 62 is clamped between the top side of the perforated disc 60 and the insert piece 51, within the central blind bore of the latter, and tensions the perforated disc 60 downwards in FIG. 3.

The telescopic shock absorber illustrated in FIG. 3 works as follows:

As long as the radial orifices 58 and 59 are blocked by the edge of the perforated disc 60, the hydraulic resistance opposing stroke movements of the piston 3 is determined solely by the channels 6 and 7 and the spring leaves 8 and 9 of the piston 3. The closing position of the perforated disc 60 is maintained as long as the coil 15 does not conduct any electrical current.

As soon as the coil 15 receives electrical current, the perforated disc 60 (as the armature of the electromagnet formed by the coil 15) the part 50 and its insert piece 51, is attracted and urged upwards, counter to the force of the helical compression spring 62. The radial orifices 58 are thereby opened more or less wide, depending on the shifting travel of the perforated disc 60. If appropriate, an axially offset arrangement of the radial orifices 58 and the associated orifices 59 or reliefs in the peripheral edge of the perforated disc 60 can also ensure that a differing number of radial orifices 58, 59 is opened, depending on the shifting travel of the perforated disc 60.

The perforated disc 60, in its upped end position, rests against bosses 63 which are formed in the plate part 52, or in the perforated disc 60, and which prevent the perforated disc 60 from coming to rest over its entire surface on the plate part 52. This guarantees that the upper and lower sides of the perforated disc 60 are always subject to the hydraulic pressure in the lower chamber 5 of the cylinder part 6. The space above the perforated disc 60 communicates with the region located below disc 60 via holes in the perforated disc 60.

Once again, as in the telescopic shock absorber according to FIG. 1, the electromagnet 15 can be controlled as a function of the pressure difference between the chambers 4 and 5 of the cylinder part 1. The corresponding control means are omitted in FIG. 3 for the sake of simplicity.

Figure 4:
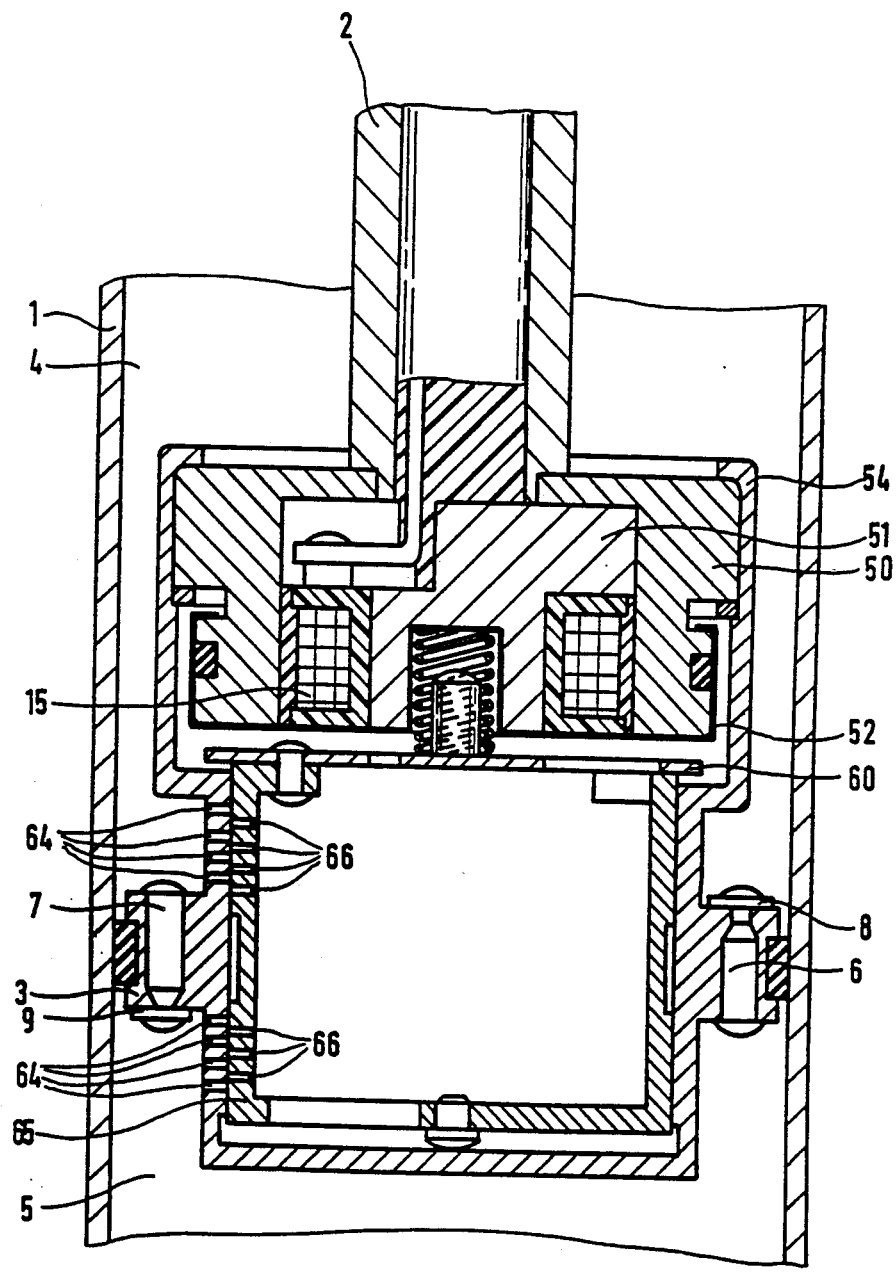
FIG. 4 shows a version of the telescopic shock absorber illustrated in FIG. 3 which is modified with respect to the valve construction with a large adjustment range and a small stroke which is achieved by means of a cascade-like bypass arrangement.

In the arrangement according to FIG. 4, the housing 54 is closed on its lower end face. Radial bores 64 are arranged in the housing 54 above and below the piston 3 in different radial planes axially from one another. Arranged slidably within the housing 54 is a hollow-cylindrical slide 65 connected to the underside of the perforated disc 60 and having radial orifices 66 which, as a result of an appropriate adjustment of the slide 65, are aligned with a differing number of radial orifices 64 of the housing 54 and which thus connect the inner space of the slide 65 to the uPper chamber 4 and to the lower chamber 5 of the cylinder part 1, so that a bypasS leading through the inner space of the slide 65 is formed between the chambers 4 and 5.

The slide 65, at its lower end, possesses a perforated bottom which, in the lower end position of the slide 65, is held at a distance from the closed lower end face of the housing 54. For this purpose, bosses, rivets or the like are arranged on the lower end face of the housing 54, or on the bottom end of the slide 65. This guarantees that the lower bottom of the slide 65 cannot cannot come to rest over its entire surface on the closed lower end face of the housing 54.

Because of the holes in the perforated disc 60, and the holes in the lower end face of the slide 65, the same hydraulic pressures as in the inner space of the slide 65 always act on the upper side of the perforated disc 60 and the lower side of the bottom end of the slide 65. Consequently, neither the perforated disc 60 nor the slide 65 are urged upwards or downwards as a result of hydraulic forces.

The shift of the slide 65, or of the perforated disc 60, is therefore controlled solely by the passage of current through the coil 15.

Figure 5A:
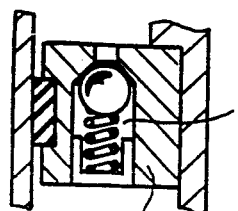
FIGS. 5 and 5B show a further modified version of the shock absorber and its valves.
Figure 5B:
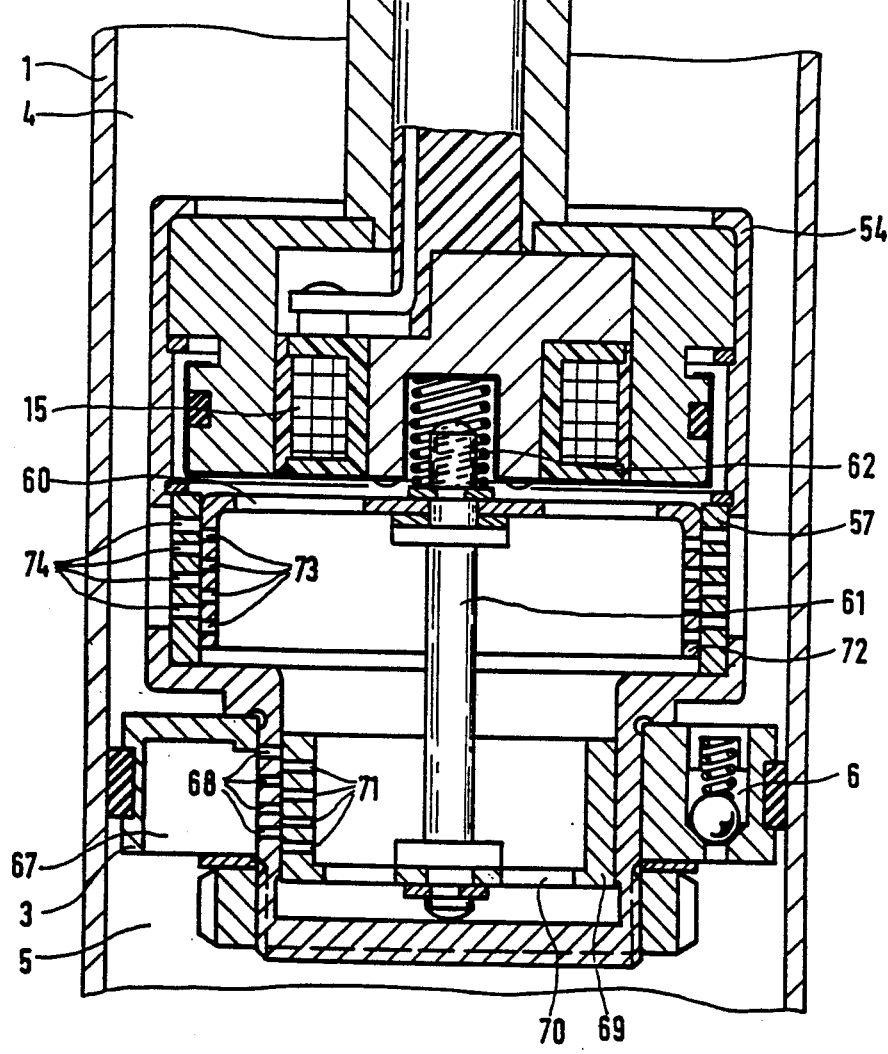

The embodiment illustrated in FIGS. 5A and 5B differs from that according to FIG. 3 in that the channels 6 and 7 in the piston 3 are controlled by spring-loaded valve balls which are arranged in the said channels 6 and 7, and function as non-return valves. See FIG. 5A and the right hand side of FIG. 5B. Furthermore, once again, the lower end face of the housing 54 is closed off by means of an end bottom.

Radial orifices 68 are arranged, spaced axially from one another, in the housing 54 in the region of recesses 67 on the underside of the piston 3. These orifices 68 are controlled by a slide 69 formed by the cylindrical edge of a further perforated disc 70, which itself is arranged firmly on the tappet 61 of the perforated disc 60 and which is axially shiftable together with the perforated disc 60. Further radial orifices 71 are arranged in the slide 69 and, as a result of an appropriate adjustment of the slide 69, can be made to overlap with the radial orifices 68.

The peripheral edge of the perforated disc 60 is designed as a slide 72 in a corresponding way and radial orifices 73 arranged in the slide 72 can be made to overlap with radial orifices 74 in the bush-like ring 57.

When no current passes through the coil 15, the helical compression spring 62 pushes the perforated disc 60, or the slides 69 and 72, into a blocking position As a result of the passage of current through the coil 15, the perforated disc 16 is pulled upwards in FIG. 5 by means of magnetic forces, in such a way that the radial orifices 68 and 71, or 73 and 74, overlap one another to a greater or lesser extent and a bypass leading through the inner space of the housing 54 from the lower chamber 5 into the upper chamber 4 of the cylinder part 1 is provided.

Neither the slide 69 nor the slide 72 can be urged upwards or downwards hydraulically, because the perforated discs 60 and 70 are each subjected to the pressure in the inner space of the housing 54 on their lower and upper sides, so that the hydraulic forces acting on the said perforated discs compensate each other. the adjustment of the slides 69 and 72 therefore takes place solely as a result of magnetic forces.

The constructive features of the above-described telescopic shock absorbers can also be combined in a different way from that described.

Furthermore, the control of the coils 15 or of the valve slides 11, 60, 65, 69 and 70 can also take place in a path-dependent manner, for example as a function of the stroke of the piston 3.

All the embodiments illustrated are characterized in that the magnetic and hydraulic parts are constructed separately and therefore can be obtained from two separate outside companies for the assembly of the shock absorber.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A hydraulic telescopic shock absorber comprising:
   a cylinder;
   a piston displaceable in said cylinder and retained by a piston rod, said piston dividing said cylinder into two chambers;
   channels between said chambers which controllably provide fluid connection between said chambers;
   a valve having a slide-type closing element that controls an opening cross-section of the channels;
   a differential pressure measuring device between said chambers, said differential pressure measuring device measuring a pressure difference between the two chambers and producing an output signal; and
   an electromagnet coupled to the differential pressure measuring device and to said valve, said electromagnet actuating said valve as a function of the output signal of the differential pressure measuring device.

2. The telescopic shock absorber according to claim 1, wherein the electromagnet includes a housing and a coil inside the housing.

3. The telescopic shock absorber according to claim 1, wherein the differential pressure measuring device includes:
   a pressure sensor 40 that provides said output signal; and
   a diaphragm that on one side is acted upon by pressure in one chamber and on the other side is acted upon by pressure in the other chamber; and
   a tappet coupled to said diaphragm and providing interaction between the diaphragm and the pressure sensor.

4. The telescopic shock absorber according to claim 1, wherein the electromagnet is configured such that when current passes through the electromagnet, the closing element is actuated by the electromagnet to reduce the throttling resistance of the channels.

5. A hydraulic telescopic shock absorber comprising:
   a cylinder;
   a piston displaceable in said cylinder and retained by a piston rod, said piston dividing said cylinder into two chambers;
   channels between said chambers which controllably provide fluid connection between said chambers;
   a valve having a slide-type closing element that controls an opening cross-section of the channels;
   an electromagnet coupled to said valve and controllably actuating the closing element, the electromagnet having a coil;
   a housing having a receiving space for said coil, said housing being sealed from hydraulic medium and arranged on a piston rod side of the piston, said housing including ferromagnetic housing parts that surround the coil in a U-shape or a C-shape;
   an armature arranged on a front face of the coil; and
   a plate made of non-magnetizable material that closes off said receiving space and is arranged between said armature and said coil.

6. The telescopic shock absorber according to claim 5, wherein one of the housing parts encloses an outer periphery of the coil and has an annular web, and wherein the plate is deepdrawn and includes a flanged edge, the flanged edge enclosing the annular web.

7. The telescopic shock absorber according to claim 6, wherein the annular web includes a peripheral groove covered by the flanged edge, and further comprising a sealing ring arranged in the annular web in the peripheral groove.

8. The telescopic shock absorber according to claim 5, further comprising stop devices on said plate or said armature, and wherein the armature is a perforated circular disk retained by said stop devices in an end position at a short distance from the plate.

9. The telescopic shock absorber according to claim 8, wherein the tops are dome-shaped bumps.

10. The telescopic shock absorber according to claim 5, further comprising a bush-like ring within the housing, and wherein the armature is a perforated circular disk, and includes a cylindrical slide part at the outer edge of the circular disk and guided in a piston-like manner in the bush-like ring and controls the channels passing through the bush-like ring.

11. The telescopic shock absorber according to claim 5, further comprising a cylindrical part that is closed on an end face and is connected to the two chambers of the cylinder by radial channels, and a hollow-cylindrical slide which has radial control orifices interacting with the radial channels, the control orifices intersecting the cross-sections of the radial channels to a different degree according to the position of the hollow-cylindrical slide.

12. The telescopic shock absorber according to claim 5, further comprising a spring arrangement that holds the hollow-cylindrical slide, when the electromagnet is without current in a position which permits and emergency operation of the telescopic shock absorber.

13. A hydraulic telescopic shock absorber according to claim 5, wherein the electromagnetic and hydraulic components are arranged separately from one another.

* * * * *